(12) United States Patent
Munoz et al.

(10) Patent No.: US 9,727,508 B2
(45) Date of Patent: Aug. 8, 2017

(54) ADDRESS LEARNING AND AGING FOR NETWORK BRIDGING IN A NETWORK PROCESSOR (71) Applicant: LSI Corporation, Milpitas, CA (US)

(72) Inventors: Robert J. Munoz, Round Rock, TX (US); Joseph A. Manzella, Macungie, PA (US); Zhong Guo, Bethlehem, PA (US); Walter A. Roper, Lebanon, NJ (US)

(73) Assignee: Intel Corporation, Santa Clara, CA (US)

( * ) Notice: Subject to any disclaimer, the term of this patent is extended or adjusted under 35 U.S.C. 154(b) by 1066 days.

(21) Appl. No.: 13/705,822

(22) Filed: Dec. 5, 2012

(65) Prior Publication Data

US 2013/0097345 A1 Apr. 18, 2013

Related U.S. Application Data (63) Continuation-in-part of application No. 12/782,379, filed on May 18, 2010, and a continuation-in-part of
(Continued)

(51) Int. Cl.
*G06F 13/38* (2006.01)
*H04L 12/933* (2013.01)
(Continued)

(52) U.S. Cl.
CPC .......... *G06F 13/385* (2013.01); *G06F 15/167* (2013.01); *H04L 47/2441* (2013.01);
(Continued)

(58) Field of Classification Search
None
See application file for complete search history.

(56) References Cited

U.S. PATENT DOCUMENTS 4,123,795 A 10/1978 Dean, Jr. et al.
4,622,631 A 11/1986 Frank et al.
(Continued)

OTHER PUBLICATIONS

T. Chiueh, P. Pradhan, "High-Performance IP Routing Table Lookup using CPU caching", Proceedings of INFOCOM '99: Eighteenth Annual Joint Conference of the IEEE Computer and Communications Societies. IEEE vol. 3, pp. 1421-1428 (1999) USA.
(Continued)

*Primary Examiner* — Corey S Faherty
(74) *Attorney, Agent, or Firm* — Nicholson De Vos Webster & Elliott LLP (57) ABSTRACT Described embodiments process data packets received that include a source address and at least one destination address. If the destination address is stored in a memory of an I/O adapter, the received data packet is processed in accordance with bridging rules associated with each destination address stored in the I/O adapter memory. If the destination address is not stored in the I/O adapter memory, the I/O adapter sends a task message to a processor to determine whether the destination address is stored in an address table stored in a shared memory of the network processor. The I/O adapter memory has lower access latency than the address table. If the destination address is stored in the address table, the received data packet is processed in accordance with bridging rules stored in the address table and the bridging rules stored in the I/O adapter memory are updated.

20 Claims, 6 Drawing Sheets

Related U.S. Application Data application No. 12/782,393, filed on May 18, 2010, now Pat. No. 8,255,644, and a continuation-in-part of application No. 12/782,411, filed on May 18, 2010, now Pat. No. 8,407,707.

(60) Provisional application No. 61/580,219, filed on Dec. 24, 2011.

(51) Int. Cl.
  *G06F 15/167* (2006.01)
  *H04L 12/931* (2013.01)
  *H04L 12/851* (2013.01)

(52) U.S. Cl.
  CPC .......... *H04L 49/101* (2013.01); *H04L 49/109* (2013.01); *H04L 49/506* (2013.01)

(56) References Cited

U.S. PATENT DOCUMENTS

| | | | |
|---|---|---|---|
| 5,394,534 A | 2/1995 | Kulakowski et al. | |
| 5,420,852 A * | 5/1995 | Anderson et al. | 370/364 |
| 5,500,860 A * | 3/1996 | Perlman et al. | 370/401 |
| 5,623,698 A | 4/1997 | Stephenson et al. | |
| 5,638,377 A * | 6/1997 | Quinquis et al. | 370/392 |
| 5,838,931 A | 11/1998 | Regenold et al. | |
| 5,875,466 A | 2/1999 | Wakerly | |
| 5,892,766 A | 4/1999 | Wicki et al. | |
| 5,893,120 A | 4/1999 | Nemes | |
| 5,909,695 A | 6/1999 | Wong et al. | |
| 5,920,539 A | 7/1999 | Schell et al. | |
| 5,940,626 A * | 8/1999 | Sollars | G06F 9/30134 712/41 |
| 5,943,283 A | 8/1999 | Wong et al. | |
| 5,974,421 A | 10/1999 | Krishnaswamy et al. | |
| 6,026,467 A | 2/2000 | Petty | |
| 6,038,630 A | 3/2000 | Foster et al. | |
| 6,052,697 A | 4/2000 | Bennett et al. | |
| 6,115,802 A | 9/2000 | Tock et al. | |
| 6,195,335 B1 | 2/2001 | Calvignac et al. | |
| 6,216,167 B1 | 4/2001 | Momirov | |
| 6,233,246 B1 | 5/2001 | Hareski et al. | |
| 6,289,013 B1 | 9/2001 | Lakshman et al. | |
| 6,341,130 B1 | 1/2002 | Lakshman et al. | |
| 6,567,564 B1 | 5/2003 | van der Wal | |
| 6,584,546 B2 | 6/2003 | Kavipurapu | |
| 6,636,932 B1 | 10/2003 | Regev et al. | |
| 6,658,012 B1 | 12/2003 | Baucom, Jr. et al. | |
| 6,839,830 B2 | 1/2005 | Liu | |
| 6,907,469 B1 | 6/2005 | Gallo et al. | |
| 6,914,882 B2 | 7/2005 | Merani et al. | |
| 6,956,854 B2 | 10/2005 | Ganesh et al. | |
| 7,058,057 B2 | 6/2006 | Dooley et al. | |
| 7,085,911 B2 | 8/2006 | Sachedina et al. | |
| 7,089,346 B2 | 8/2006 | Cebulla et al. | |
| 7,159,219 B2 | 1/2007 | Chen et al. | |
| 7,234,018 B1 | 6/2007 | Purcell et al. | |
| 7,287,046 B2 | 10/2007 | Bulka et al. | |
| 7,397,809 B2 | 7/2008 | Wang | |
| 7,400,623 B2 | 7/2008 | Chen | |
| 7,453,898 B1 | 11/2008 | Cohen et al. | |
| 7,461,208 B1 | 12/2008 | Caprioli et al. | |
| 7,461,407 B2 | 12/2008 | Little et al. | |
| 7,512,740 B2 | 3/2009 | Diefendorff | |
| 7,519,065 B2 | 4/2009 | Angle et al. | |
| 7,536,473 B2 * | 5/2009 | Ajanovic et al. | 709/234 |
| 7,554,464 B1 | 6/2009 | Oberdorfer | |
| 7,594,028 B1 | 9/2009 | Jacobs et al. | |
| 7,596,142 B1 | 9/2009 | MacAdam | |
| 7,600,078 B1 | 10/2009 | Cen et al. | |
| 7,659,894 B2 | 2/2010 | Keller et al. | |
| 7,660,259 B1 | 2/2010 | Grosser et al. | |
| 7,707,367 B1 | 4/2010 | Tran et al. | |
| 7,710,988 B1 | 5/2010 | Tripathi et al. | |
| 7,720,055 B2 | 5/2010 | Kadambi et al. | |
| 7,724,734 B1 | 5/2010 | Grosser et al. | |
| 7,849,315 B2 | 12/2010 | Hardy et al. | |
| 7,886,150 B2 | 2/2011 | Stollon et al. | |
| 7,929,545 B2 | 4/2011 | Martinotti et al. | |
| 8,127,350 B2 | 2/2012 | Wei et al. | |
| 8,135,926 B1 | 3/2012 | Glasco et al. | |
| 8,140,759 B2 | 3/2012 | Frey et al. | |
| 2002/0029214 A1 | 3/2002 | Yianilos et al. | |
| 2002/0085507 A1 | 7/2002 | Ku et al. | |
| 2002/0099913 A1 | 7/2002 | Steely, Jr. | |
| 2002/0165985 A1 | 11/2002 | Chen et al. | |
| 2003/0033276 A1 | 2/2003 | Cheng et al. | |
| 2003/0115417 A1 | 6/2003 | Corrigan | |
| 2003/0123468 A1 | 7/2003 | Nong | |
| 2004/0068616 A1 | 4/2004 | Tierney et al. | |
| 2004/0255209 A1 | 12/2004 | Gross | |
| 2005/0027920 A1 | 2/2005 | Fitzsimmons et al. | |
| 2005/0141537 A1 | 6/2005 | Kumar et al. | |
| 2005/0152352 A1 | 7/2005 | Jun et al. | |
| 2005/0160132 A1 | 7/2005 | Van Doren et al. | |
| 2005/0235134 A1 * | 10/2005 | O'Sullivan | G06F 9/3004 712/10 |
| 2006/0029079 A1 | 2/2006 | Cohen et al. | |
| 2006/0256783 A1 | 11/2006 | Ayrapetian et al. | |
| 2007/0011396 A1 | 1/2007 | Singh et al. | |
| 2007/0016756 A1 | 1/2007 | Hsieh et al. | |
| 2007/0043856 A1 | 2/2007 | Morris et al. | |
| 2007/0050559 A1 * | 3/2007 | Alsup | G06F 9/3004 711/145 |
| 2007/0201451 A1 * | 8/2007 | Bennett | 370/356 |
| 2007/0226798 A1 | 9/2007 | Sibert | |
| 2007/0271374 A1 | 11/2007 | Shomura et al. | |
| 2008/0046657 A1 | 2/2008 | Eichenberger et al. | |
| 2008/0077928 A1 | 3/2008 | Matsuzaki et al. | |
| 2008/0092092 A1 | 4/2008 | Dalton et al. | |
| 2008/0155002 A1 | 6/2008 | Janczak et al. | |
| 2008/0162793 A1 | 7/2008 | Chu et al. | |
| 2008/0239992 A1 | 10/2008 | Krasnyanskiy | |
| 2008/0240103 A1 | 10/2008 | Schmidt | |
| 2008/0240106 A1 | 10/2008 | Schlenk | |
| 2009/0006718 A1 | 1/2009 | Blumrich et al. | |
| 2009/0019270 A1 | 1/2009 | Halter et al. | |
| 2009/0249318 A1 | 10/2009 | Ayguade et al. | |
| 2009/0271562 A1 | 10/2009 | Sinclair | |
| 2010/0100682 A1 | 4/2010 | Guthrie et al. | |
| 2010/0260198 A1 | 10/2010 | Rojas-Cessa et al. | |
| 2010/0293353 A1 | 11/2010 | Sonnier et al. | |
| 2011/0145501 A1 | 6/2011 | Steely, Jr. et al. | |
| 2011/0219195 A1 | 9/2011 | Habusha et al. | |

OTHER PUBLICATIONS

IEEE Std. 802.1D, "Standard for Local and metropolitan area networks: Media Access Control (MAC) Bridges", IEEE Computer Society, (2004) USA.

Office action from related U.S. Appl. No. 13/192,104, dated Jun. 16, 2014, 25 pages.

Office action from related U.S. Appl. No. 13/192,104, dated Sep. 29, 2014, 26 pages.

Office action from related U.S. Appl. No. 13/192,104, dated Jan. 29, 2015, 27 pages.

\* cited by examiner

ADDRESS LEARNING AND AGING FOR NETWORK BRIDGING IN A NETWORK PROCESSOR

CROSS-REFERENCE TO RELATED APPLICATIONS

This application claims the benefit of the filing date of U.S. provisional application No. 61/580,219, filed on Dec. 24, 2011, the teachings of which are incorporated herein by reference.

This application is a continuation-in-part, and claims the benefit of the filing date, of U.S. patent application Ser. No. 12/782,379 filed May 18, 2010, Ser. No. 12/782,393 filed May 18, 2010, now issued as U.S. Pat. No. 8,255,644, and Ser. No. 12/782,411 filed May 18, 2010, now issued as U.S. Pat. No. 8,407,707, the teachings of which are incorporated herein in their entireties by reference.

The subject matter of this application is related to U.S. patent application Ser. No. 12/430,438 filed Apr. 27, 2009, now issued as U.S. Pat. No. 8,352,669, Ser. No. 12/729,226 filed Mar. 22, 2010, Ser. No. 12/729,231 filed Mar. 22, 2010, now issued as U.S. Pat. No. 8,473,657, Ser. No. 12/963,895 filed Dec. 9, 2010, now issued as U.S. Pat. No. 8,499,137, Ser. No. 12/971,742 filed Dec. 17, 2010, Ser. No. 12/974,477 filed Dec. 21, 2010, Ser. No. 12/975,823 filed Dec. 22, 2010, now issued as U.S. Pat. No. 8,505,013, Ser. No. 12/975,880 filed Dec. 22, 2010, now issued as U.S. Pat. No. 8,514,874, Ser. No. 12/976,045 filed Dec. 22, 2010, Ser. No. 12/976,228 filed Dec. 22, 2010, Ser. No. 12/979,551 filed Dec. 28, 2010, now issued as U.S. Pat. No. 8,489,791, Ser. No. 12/979,665 filed Dec. 28, 2010, now issued as U.S. Pat. No. 8,489,792, Ser. No. 12/979,800 filed Dec. 28, 2010, now issued as U.S. Pat. No. 8,489,794, Ser. No. 13/046,717 filed Mar. 12, 2011, Ser. No. 13/046,719 filed Mar. 12, 2011, now issued as U.S. Pat. No. 8,321,385, Ser. No. 13/046,726 filed Mar. 12, 2011, Ser. No. 13/192,104 filed Jul. 27, 2011, Ser. No. 13/192,140 filed Jul. 27, 2011, Ser. No. 13/192,187 filed Jul. 27, 2011, Ser. No. 13/232,422 filed Sep. 14, 2011, Ser. No. 13/250,898 filed Sep. 30, 2011, Ser. No. 13/274,726 filed Oct. 17, 2011, Ser. No. 13/310,961 filed Dec. 5, 2011, Ser. No. 13/316,145 filed Dec. 9, 2011, Ser. No. 13/359,690 filed Jan. 27, 2012, Ser. No. 13/405,053 filed Feb. 23, 2012, Ser. No. 13/403,468 filed Feb. 23, 2012, Ser. No. 13/409,432 filed Mar. 1, 2012, Ser. No. 13/474,114 filed May 17, 2012, Ser. No. 13/480,623 filed May 25, 2012, Ser. No. 13/568,365 filed Aug. 7, 2012, Ser. No. 13/687,719, filed on Nov. 28, 2012, Ser. No. 13/687,772, filed on Nov. 28, 2012, Ser. No. 13/687,865, filed on Nov. 28, 2012, Ser. No. 13/687,911, filed on Nov. 28, 2012, and Ser. No. 13/687,971, filed on Nov. 28, 2012, the teachings of all of which are incorporated herein in their entireties by reference.

BACKGROUND

Network processors are generally used for analyzing and processing packet data for routing and switching packets in a variety of applications, such as network surveillance, video transmission, protocol conversion, voice processing, and internet traffic routing. A network processor might employ a destination Media Access Control (MAC) address embedded in a packet generated by a source network device to transmit the packet to one or more appropriate target devices.

A network processor operating in accordance with IEEE 802.1D (see sections 7.8 and 7.9 of 802.1D-2004, included by reference herein) might "learn" MAC addresses of source and destination network devices to provide more efficient processing of packets. To "learn" MAC addresses, a network processor might store a table of MAC addresses and the corresponding port to which the device having that MAC address is connected. When a packet is received from a new network device, the network processor stores the MAC address and the port from which the packet was received. Thus, when a received packet is destined for a MAC address that is stored in the table, the network processor forwards the packet to the port stored in the table without sending traffic on other ports. A network processor operating in accordance with IEEE 802.1D might also remove older or unused MAC addresses from the table ("aging"). MAC address aging maintains efficient processing of packets by removing infrequently-used addresses from the table. Removing infrequently-used addresses saves storage space and allows the network processor to find the MAC addresses more quickly.

Many hardware-based MAC address learning and aging mechanisms support higher-speed performance in part because they store MAC addresses in dedicated on-chip memory, typically limiting maximum usable table sizes. Many software-based MAC address learning and aging mechanisms support high table capacity through the use of external DRAM, though they often have slower performance and consume a non-trivial amount of processing resources to maintain and check the address table.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Described embodiments process data packets received that include a source address and at least one destination address. If the destination address is stored in a memory of an I/O adapter, the received data packet is processed in accordance with bridging rules associated with each destination address stored in the I/O adapter memory. If the destination address is not stored in the I/O adapter memory, the I/O adapter sends a task message to a processor to determine whether the destination address is stored in an address table stored in a shared memory of the network processor. The I/O adapter memory has lower access latency than the address table. If the destination address is stored in the address table, the received data packet is processed in accordance with bridging rules stored in the address table and the bridging rules stored in the I/O adapter memory are updated.

BRIEF DESCRIPTION OF THE DRAWING FIGURES

Other aspects, features, and advantages of the described embodiments will become more fully apparent from the following detailed description, the appended claims, and the accompanying drawings in which like reference numerals identify similar or identical elements.

DETAILED DESCRIPTION

Described embodiments process data packets received that include a source address and at least one destination address. If the destination address is stored in a memory of an I/O adapter, the received data packet is processed in accordance with bridging rules associated with each destination address stored in the I/O adapter memory. If the destination address is not stored in the I/O adapter memory, the I/O adapter sends a task message to a processor to determine whether the destination address is stored in an address table stored in a shared memory of the network processor. The I/O adapter memory has lower access latency than the address table. If the destination address is stored in the address table, the received data packet is processed in accordance with bridging rules stored in the address table and the bridging rules stored in the I/O adapter memory are updated.

Table 1 defines a list of acronyms employed throughout this specification as an aid to understanding the described embodiments:

TABLE 1

| ACL | Access Control List |
|---|---|
| AMBA | Advanced Microcontroller Bus Architecture |
| AXI | Advanced eXtensible Interface |
| COS | Class of Service |
| CPU | Central Processing Unit |
| CRC | Cyclic Redundancy Check |
| DDR | Double Data Rate |
| DMA | Direct Memory Access |
| DRAM | Dynamic Random Access Memory |
| ECC | Error Correction Code |
| FC | Fibre Channel |
| FIFO | First-In, First-Out |
| I/O | Input/Output |
| IP | Internet Protocol |
| JTAG | Joint Test Action Group |
| LRU | Least Recently Used |
| MAC | Media Access Control |
| µP | Microprocessor |
| MMB | Memory Manager Block |
| MPLS | Multi-Protocol Label Switching |
| MPP | Modular Packet Processor |
| MRU | Most Recently Used |
| MTM | Modular Traffic Manager |
| OSI | Open Systems Interconnection |
| PAB | Packet Assembly Block |
| PCI-E | Peripheral Component Interconnect Express |
| PDU | Protocol Data Unit |
| PLB | Processor Local Bus |
| RF | Radio Frequency |
| SAS | Serial Attached SCSI |
| SATA | Serial Advanced Technology Attachment |
| SCH | Scheduler |
| SCSI | Small Computer System Interface |
| SED | Stream Editor |
| SLIP | Serial Line Internet Protocol |
| SoC | System-on-Chip |
| SPI | Serial Peripheral Interface |
| SPP | Security Protocol Processor |

TABLE 1-continued

| SRIO | Serial Rapid I/O |
|---|---|
| SWD | Serial Wire Debug |
| TCP | Transmission Control Protocol |
| UART | Universal Asynchronous Receiver/Transmitter |
| UDP | User Datagram Protocol |
| USB | Universal Serial Bus |
| VLAN | Virtual Local Area Network |

Figure 1:
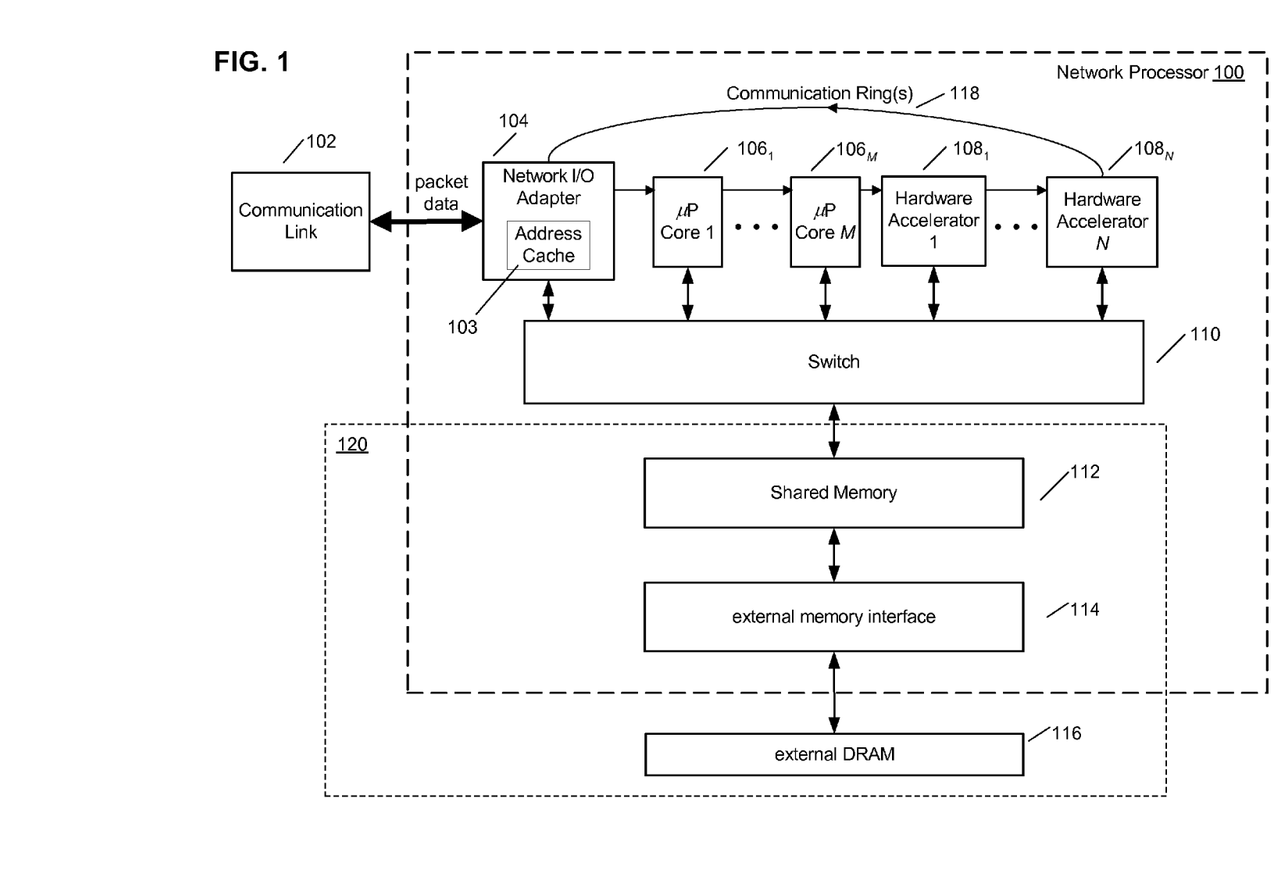
FIG. 1 shows a block diagram of a network processor in accordance with exemplary embodiments.

FIG. 1 shows a block diagram of an exemplary network processor system (network processor 100) implemented as a system-on-chip (SoC). Network processor 100 might be used for processing data packets, performing protocol conversion, encrypting, and decrypting data packets, or the like. As shown in FIG. 1, network processor 100 includes on-chip shared memory 112, one or more input-output (I/O) interfaces collectively shown as network I/O adapter 104, one or more microprocessor (µP) cores 106$_1$-106$_M$, and one or more hardware accelerators 108$_1$-108$_N$, where M and N are integers greater than or equal to 1. Network processor 100 also includes external memory interface 114 for communication with external memory 116. Shared memory 112 might be implemented as embedded dynamic random-access memory (eDRAM) internal to network processor 100. External memory 116 might typically be implemented as a dynamic random-access memory (DRAM), such as a double-data-rate three (DDR-3) DRAM, for off-chip storage of data. In some embodiments, such as shown in FIG. 1, each of the one or more I/O interfaces, µP cores and hardware accelerators might be coupled through switch 110 to shared memory 112. Switch 110 might be implemented as a non-blocking crossbar switch such as described in related U.S. patent application Ser. No. 12/430,438 filed Apr. 27, 2009, Ser. No. 12/729,226 filed Mar. 22, 2010, and Ser. No. 12/729,231 filed Mar. 22, 2010, which are incorporated by reference herein.

Network I/O adapter 104 might typically be implemented as hardware that connects network processor 100 to one or more external devices, such as a computer system or networking device, which interface with network processor 100. Network I/O adapter 104 might be a custom-designed communication link, or might conform to a standard communication protocol such as, for example, a Small Computer System Interface ("SCSI") protocol bus, a Serial Attached SCSI ("SAS") protocol bus, a Serial Advanced Technology Attachment ("SATA") protocol bus, a Universal Serial Bus ("USB"), an Ethernet link, an IEEE 802.11 link, an IEEE 802.15 link, an IEEE 802.16 link, a Peripheral Component Interconnect Express ("PCI-E") link, a Serial Rapid I/O ("SRIO") link, or any other interface link. Received packets are preferably placed in a buffer in shared memory 112 by transfer between network I/O adapter 104 and shared memory 112 through switch 110.

In embodiments of the present invention, shared memory 112 is a conventional memory operating as a cache that might be allocated and/or subdivided. For example, shared memory 112 might include one or more FIFO queues that might be dynamically allocated to the various µP cores 106 and hardware accelerators 108. External memory interface 114 couples shared memory 112 to one or more external memories, shown as external memory 116, to provide off-chip storage of data not currently in use by the various µP cores 106 and hardware accelerators 108 to free space in shared memory 112. As indicated by the dashed line, shared memory 112 and external memory 116 might generally be referred to as system memory 120. Hardware accelerators 108 might interact with each other, for example, by one or more communication bus rings 118 that pass "tasks" from a source core to a destination core. As described herein, tasks are instructions to the destination core to perform certain functions, and a task might contain address pointers to data stored in shared memory 112, as described in related U.S. patent application Ser. Nos. 12/782,379, 12/782,393, and 12/782,411 all filed May 18, 2010, which are incorporated by reference herein.

Network processor 100 might typically receive data packets from one or more source devices, perform processing operations for the received data packets, and transmit data packets out to one or more destination devices. As shown in FIG. 1, one or more data packets are transmitted from a transmitting device (not shown) to network processor 100, via network I/O adapter 104. Network processor 100 might receive data packets from one or more active data streams concurrently from communication link 102. Network I/O adapter 104 might parse the received data packet and provide the received data packet, via switch 110, to a buffer in shared memory 112.

Network I/O adapter 104 provides various types of I/O interface functions and, in exemplary embodiments described herein, is a command-driven hardware accelerator that aids in connecting network processor 100 to external devices. Received packets are preferably placed in shared memory 112 and then one or more corresponding tasks are generated. Transmitted packets are preferably generated from data in shared memory 112 for one or more corresponding tasks and might be transmitted out of network processor 100. Exemplary I/O interfaces include Ethernet I/O adapters providing integrity checks of incoming data. The I/O adapters might also provide timestamp data for received and transmitted packets that might be used to implement features such as timing over packet (e.g., specified in the standard recommendations of IEEE 1588). In alternative embodiments, network I/O adapter 104 might be implemented as input (receive) only or output (transmit) only interfaces.

Tasks allow network processor 100 to process a wide variety of data and control messages more efficiently than with a fixed pipeline or non-pipelined architecture. As discussed in more detail below, the sequence of processing of the tasks depends on i) the type of packet and ii) the type of processing performed by the various cores on a particular packet (or group of packets), control message, or other data. This is referred to herein as a "Virtual Pipeline™", a trademark of LSI Corporation, of Milpitas, Calif. In embodiments of the present invention, each of a plurality of virtual pipelines operate by each processing module of network processor 100 receiving a task, executing that task, and assigning a subsequent task to another (or the same) processing module depending on an identification of a virtual pipeline corresponding to the task. As described herein, tasks are instructions to the destination core to perform certain functions, and a task might be passed substantially as described in related U.S. patent application Ser. Nos. 12/782,379, 12/782,393, and 12/782,411 all filed May 18, 2010, which are incorporated by reference herein.

The various µP cores 106 and hardware accelerators 108 of network processor 100 might include several exemplary types of processors or accelerators. For example, the various µP cores 106 might be implemented as Pentium®, Power PC® or ARM processors or a combination of different processor types (Pentium® is a registered trademark of Intel Corporation, ARM processors are by ARM Holdings, plc, and Power PC® is a registered trademark of IBM). The various hardware accelerators 108 might include, for example, one or more function-specific modules, such as a Modular Packet Processor (MPP), a Packet Assembly Block (PAB), a Modular Traffic Manager (MTM), a Memory Management Block (MMB), a Stream Editor (SED), a Security Protocol Processor (SPP), a Regular Expression (RegEx) engine, and other special-purpose modules.

The MTM is a software-driven accelerator that provides packet scheduling and possibly up to six levels of scheduling hierarchy. The MTM might support millions of queues and schedulers (enabling per flow queuing if desired). The MTM might provide support for shaping and scheduling with smooth deficit weighed round robin (SDWRR) for every queue and scheduler. The MTM might also support multicasting. Each copy of a packet is scheduled independently and traverses down one or more virtual pipelines enabling multicast with independent encapsulations or any other processing. The MTM might also contain a special purpose processor that can be used for fine-grained control of scheduling decisions. The MTM might be used to make discard decisions as well as scheduling and shaping decisions. The MTM might operate substantially as described in related U.S. patent application Ser. No. 13/232,422, filed Sep. 14, 2011 and Ser. No. 13/250,898 filed Sep. 30, 2011, which are incorporated by reference herein.

The SED is a software-driven accelerator that allows for editing of packets. The SED performs packet editing functions that might include adding and modifying packet headers as well as fragmenting or segmenting data (e.g., IP fragmentation). The SED receives packet data as well as parameters from tasks and a task specified per-flow state. The output of the SED can become the outgoing packet data and can also update task parameters.

The RegEx engine is a packet search engine for state-based cross-packet pattern matching. The RegEx engine is a multi-threaded accelerator. An exemplary RegEx engine might be implemented such as described in U.S. Pat. No. 7,430,652 to Hundley, U.S. Pat. No. 7,899,904 to Ruehle and U.S. Pat. No. 7,512,592 to Lemoine, the teachings of which are incorporated by reference herein in their entireties.

The SPP provides encryption/decryption capabilities and is a command-driven hardware accelerator, preferably having the flexibility to handle protocol variability and changing standards with the ability to add security protocols with firmware upgrades. The ciphers and integrity (hash) functions might be implemented in hardware. The SPP has a multiple ordered task queue mechanism, discussed in more detail below, that is employed for load balancing across the threads.

The MMB allocates and frees memory resources in shared memory 112. Memory is allocated for such applications as task FIFO storage, packet data storage, hash-table collision handling, timer event management, and traffic manager queues. The MMB provides reference counts to each block of memory within shared memory 112. Multiple reference counts allow for more efficient storage of information, such as multicast traffic (data to be sent to multiple destinations) or for retransmission. Multiple reference counts remove a need for replicating data each time the data is needed. The MMB preferably tracks the memory allocations using a stack-based approach since a memory block recently released is preferably the next block to be allocated for a particular task, reducing cache thrashing and cache tracking overhead. Blocks in shared memory 112 might be dynamically allocated by the MMB to store data, with the blocks in one of the following sizes: 256, 2048, 16384, and 65536 bytes. The MMB might operate substantially as described in related U.S. patent application Ser. No. 12/963,895 filed Dec. 9, 2010 and Ser. No. 13/359,690 filed Jan. 27, 2012, the teachings of which are incorporated by reference herein.

The PAB is a command driven hardware accelerator providing a holding buffer with packet assembly, transmit, retransmit, and delete capabilities. An incoming task to the PAB can specify to insert/extract data from anywhere in any assembly buffer. Gaps are supported in any buffer. Locations to insert and extract can be specified to the bit level. Exemplary traditional packet reassembly functions might be supported, such as IP defragmentation. The PAB might also support generalized holding buffer and sliding window protocol transmit/retransmit buffering, providing an offload for features like TCP origination, termination, and normalization. The PAB might operate substantially as described in related U.S. patent application Ser. No. 12/971,742 filed Dec. 17, 2010, and Ser. No. 13/405,053 filed Feb. 23, 2012, the teachings of which are incorporated by reference herein.

The MPP is a multi-threaded special purpose processor that provides tree based longest prefix and access control list classification. The MPP also has a hardware hash-based classification capability with full hardware management of hash-table additions, deletions, and collisions. Optionally associated with each hash entry is a timer that might be used under software control for tasks such as connection timeout and retransmission timing. The MPP contains a statistics and state management engine, which when combined with the hash table and timer facilities, provides support for state-based protocol processing. The MPP might support millions of flows, limited only by the amount of DRAM capacity assigned to the functions. The MPP architecture might be able to store all per thread states in memory instead of in register files. The MPP might operate substantially as described in related U.S. patent application Ser. No. 12/974,477 filed Dec. 21, 2010, Ser. Nos. 12/975,823, 12/975,880, 12/976,045, and 12/976,228 all filed Dec. 22, 2010, which are incorporated by reference herein. The MPP might also include hash functionality such as described in related U.S. patent application Ser. Nos. 13/046,717, 13/046,719, and 13/046,726 all filed Mar. 12, 2011, Ser. No. 13/403,468 filed Feb. 23, 2012 and Ser. No. 13/474,114 filed May 17, 2012, which are incorporated by reference herein.

Figure 2:
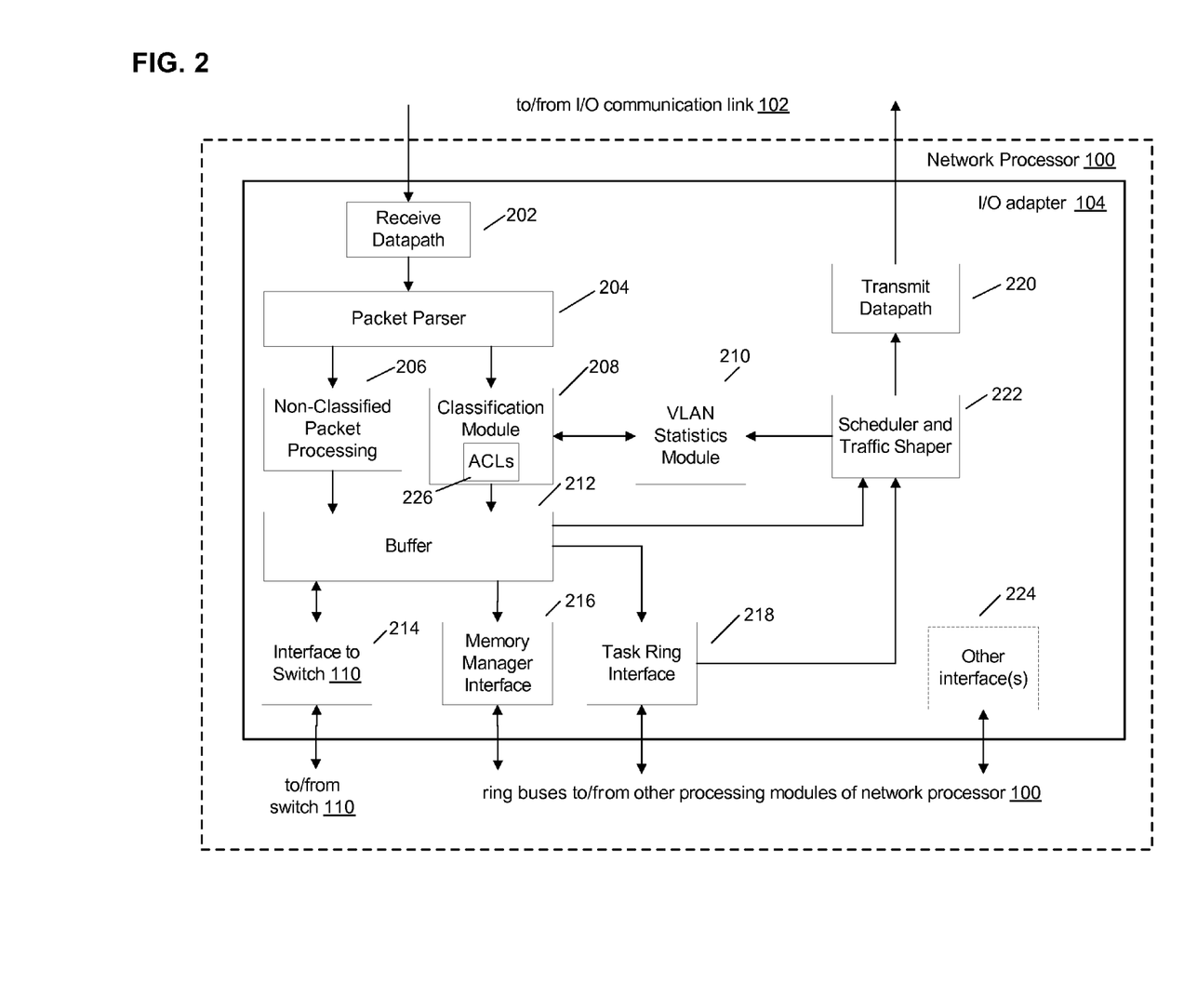
FIG. 2 shows an exemplary block diagram of an I/O port processing module of the network processor of FIG. 1.

FIG. 2 shows a block diagram of network I/O adapter 104. As described herein, network I/O adapter 104 might be at least one of a SCSI protocol bus, a SAS protocol bus, a SATA protocol bus, a USB bus, an Ethernet link, an IEEE 802.11 link, an IEEE 802.15 link, an IEEE 802.16 link, a PCI-E link, an SRIO, or other similar interfaces. In some embodiments, network I/O adapter 104 might also include one or more debug interfaces for interfacing with, for example, development tools of users of network processor 100, such as a debugger operating in compliance with a Joint Test Action Group (JTAG) interface, a Serial Wire Debug (SWD) interface, or miscellaneous interfaces such as Serial Peripheral Interface (SPI), a Serial Line Internet Protocol (SLIP) interface or a Universal Asynchronous Receiver/Transmitter (UART) such as described in related U.S. patent application Ser. No. 13/274,726 filed Oct. 17, 2011. As shown in FIG. 2, network I/O adapter 104 might include receive datapath 202 and transmit datapath 220. Receive datapath 202 provides data received from the network (e.g., communication link 102) to packet parser 204.

Packet parser 204 extracts various data fields from received packets. For example, packet parser 204 might extract OSI Layer 2, Layer 3 or Layer 4 fields from the received packet, such as MAC addresses, MPLS addresses, IP addresses, or TCP/UDP port addresses. Packet parser 204 might also perform some verification of the received packet, such as verifying a CRC value or IPv4 checksum, or verifying that the packet is properly formed. Depending on the extracted data, packet parser 204 might also perform special processing for a received packet. For example, packet parser 204 might detect Ethernet Synchronization Messaging Channel (ESMC) packets and provide them to a specialized data flow of network processor 100. Some specialized packets might be provided to non-classified packet processing module 206, which might generate and enqueue a task for processing within network processor 100 without further processing by network I/O adapter 104. For example, Ethernet "pause" packets, Ethernet "runt" packets, and ESMC packets might be provided to non-classified packet processing module 206.

Typical received packets might be provided to classification module 208. Classification module 208 might include one or more access control lists (ACLs) 226 and might perform bridging, policing, and correlation for received packets. For example, classification module 208 might be employed to determine, via ACLs 226 or one or more bridging lists (not shown), one or more destinations corresponding to a received packet. For example, some embodiments of the present invention might support MAC address bridging in accordance with IEEE 802.1D. Each ACL 226 might include one or more rules based on at least one of a VLAN corresponding to the packet and a port corresponding to the packet. Classification module 208 might also check rate limits for corresponding VLANs and ports.

After processing by either module 206 or classification module 208, received packet data might be stored in buffer 212 before being written, via interface 214, to system memory 120. One or more memory blocks in system memory 120 might be allocated to store the received packet data based on a request sent to the MMB via memory manager interface 216. The one or more tasks generated, corresponding to the received packet, are provided to subsequent processing modules of network processor 100 via task ring interface 218. As shown in FIG. 2, network I/O adapter 104 might also have one or more additional communications interfaces (e.g., a clock signal, etc.) with various modules of network processor 100, shown as other interfaces 224.

Network I/O adapter 104 receives tasks from task ring interface 218 corresponding to packets for transmission onto the network (e.g., via communication link 102). Tasks received from ring interface 218 provide address(es) in system memory 120 of packet data to be transmitted. Scheduler and traffic shaper 222 schedules packets for transmission by network I/O adapter 104. Scheduler and traffic shaper 222 might shape packet traffic based on per-port credits, where the credits are based on packet size. A data packet for transmission is provided to transmit datapath 220, which transmits the data packet to a destination.

VLAN statistics module 210 might maintain one or more statistics for various virtual local area networks of network processor 100. Such statistics might include a number of packets transmitted, a number of bytes transmitted, a number of packets received, and a number of bytes received for each VLAN of network processor 100. VLAN statistics module 210 receives inputs from classification module 208 (e.g., corresponding to packets received by network processor 100) and scheduler and traffic shaper 222 (e.g., corresponding to packets transmitted by network processor 100) to track one or more statistics of each transmitted and received packet. VLAN statistics module 210 might operate substantially as described in related U.S. patent application Ser. No. 13/310,961 filed Dec. 5, 2011.

Typical OSI level 2 networking devices such as a LAN switch/bridge might learn MAC addresses of connected devices in the network to identify on which port to send traffic. Such LAN bridges might typically keep a MAC learning table or bridging table to associate known MAC addresses with a given port. For example, the source MAC address of each packet received by the LAN bridge is stored in the table so that future packets destined for that address can be forwarded only to the bridge interface or port on which that address is located. Packets destined for unrecognized addresses are forwarded out every bridge interface or port. This scheme helps minimize traffic on the attached LANs. MAC address learning is defined in the IEEE 802.1 standard (see sections 7.8 and 7.9 of 802.1D-2004, included by reference herein). However, in hardware-based solutions, limited memory resources in a LAN bridge can limit the maximum number of MAC addresses that can be learned in the bridge table. In some implementations, the manner in which the hardware memory is organized and searched, such as when certain hash table-based approaches are used, can limit the minimum guaranteed number of addresses that can be stored in the hardware-based mechanism under worst case conditions. Conversely, software-based solutions use a slower external memory and consume processing cycles to access the memory.

Described embodiments, such as network processor 100, employ a hardware-based mechanism as a front end to a software-based mechanism. The software-based mechanism uses higher-latency system memory compared to the hardware-based mechanism. Upon receiving a data packet, network I/O Adapter 104 determines at least one of a source MAC address and one or more destination MAC addresses for the data packet. The determined MAC addresses might be stored in address cache 103 within network I/O adapter 104. The data packet might be provided from network I/O adapter 102 to one or more processing modules of network processor 100 (e.g., µP cores 106 or hardware accelerators 108) for processing of the data packet, if needed. Additionally, a control signal might be sent from network I/O adapter 102 to a control processor of network processor 100 (e.g., one of µP cores 106) to indicate the learned MAC addresses. Network processor 100 then stores the learned MAC addresses in system memory 120.

The hardware-based front-end (e.g., network I/O adapter 104) performs address learning and aging for the most frequently and recently used MAC addresses. Therefore, the software-based memory is only accessed for a relatively small percentage of address look-ups that are not accommodated by the hardware-based memory. Described embodiments synchronize the hardware table stored in address cache 103 and the software bridging table stored in system memory 120. In embodiments having multiple independent hardware-based caches, synchronization is maintained between all of the caches and the software table stored in system memory 120.

When the hardware-based mechanism sends the packet into the system, it indicates, via metadata carried with the packet, the MAC address table lookup result which also indicates whether the destination MAC address was known or not. The software-based mechanism only needs to do a destination MAC lookup on those packets with destination addresses, which are not known by the hardware-based mechanism.

As described herein, described embodiments provide: (1) a mechanism for hardware and software bridging to keep in synchronization by using the task ring (e.g., one of communication rings 118) of network processor 100. The synchronization does not require software running on a control processor of network processor 100 (e.g., one of µP cores 106), but that can instead be performed using field-programmable logic within the MPP engine of network processor 100. Synchronization supports both adding and removing addresses from the both the hardware memory and the software memory.

Figure 3:
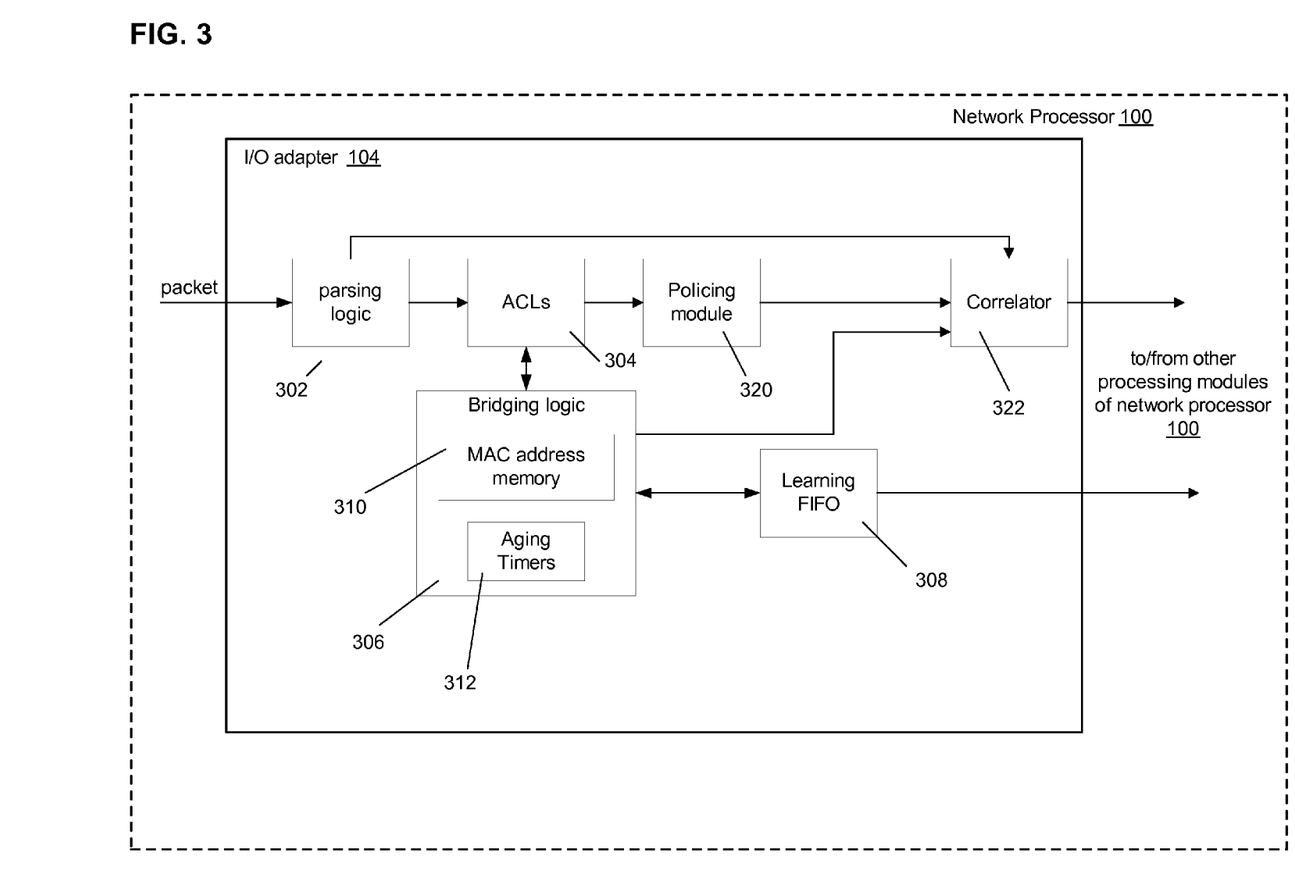
FIG. 3 shows an exemplary block diagram of a network I/O adapter of the network processor of FIG. 1.

FIG. 3 shows a block diagram of network I/O adapter 104. As shown in FIG. 3, a data packet is received from the line via parsing logic module 302, and the data packet is passed to access control list (ACL) module 304 and bridging logic module 306. Bridging logic module 306 is responsible for determining where the data packet is destined for and also implements hardware learning and aging. Bridging logic module 306 controls learning through use of MAC address table 310 and aging timers 312. When hardware learning or aging occurs, bridging logic module 306 sends a task to learning FIFO 308 which in turn sends the task to the task ring (e.g., one of rings 118). If FIFO 308 backs up, bridging logic module 306 disables learning and aging, thus ensuring the addresses stored in different memories of network processor 100 remain synchronized.

Figure 4:
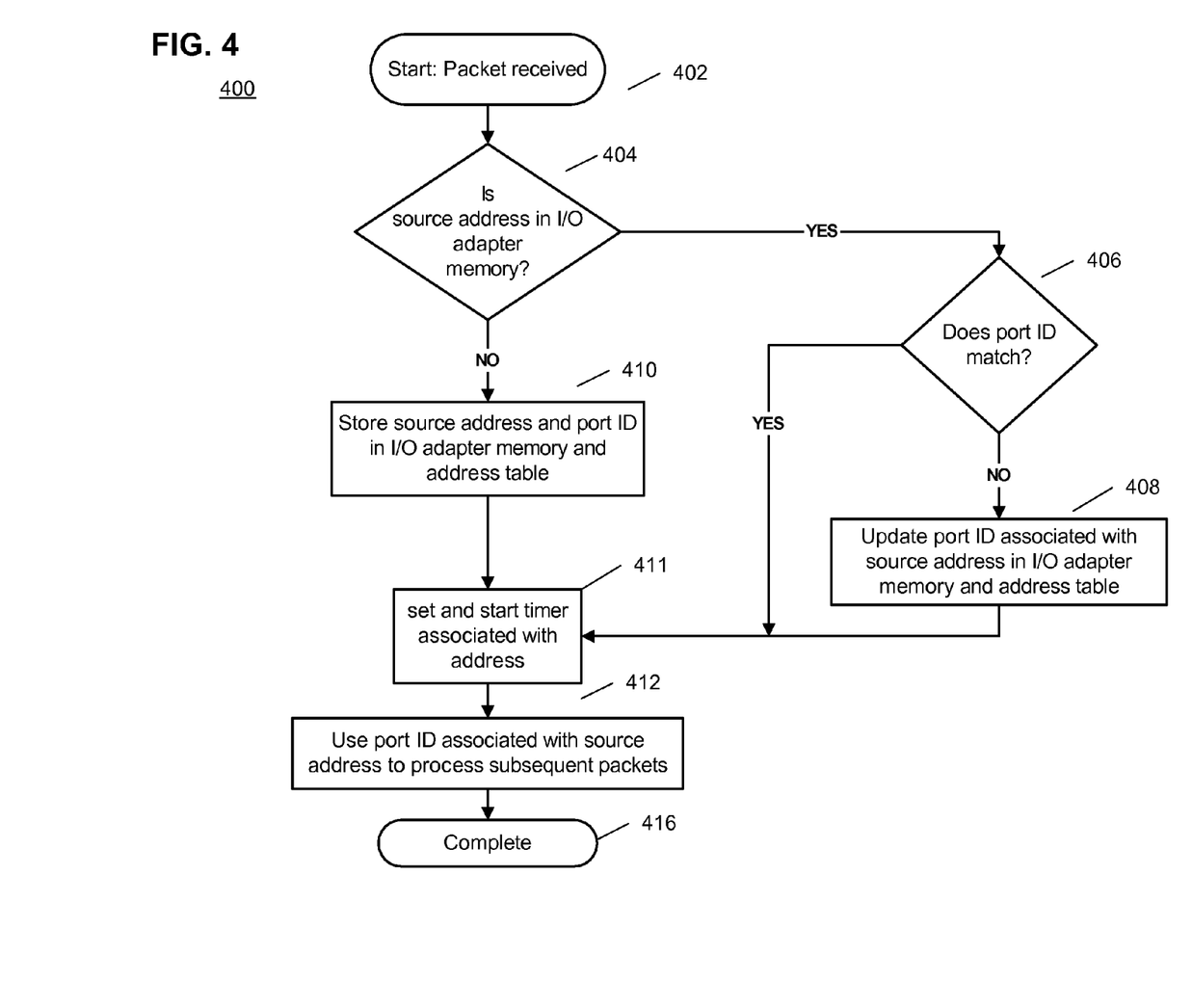
FIG. 4 shows an exemplary flow diagram of processing packets with known or unknown source addresses in the network processor of FIG. 1.

FIG. 4 shows a flow diagram of process 400 for processing packets depending on whether a source MAC address of a packet is known or unknown. At step 402, a packet is received by network processor 100. At step 404, network processor 100 determines whether the source MAC address is stored in the I/O adapter memory (e.g., cache memory 103 of network I/O adapter 104 as shown in FIG. 1, MAC address memory 310 of FIG. 3). If, at step 404, network processor 100 determines the source MAC address is stored in the I/O adapter memory, then, at step 406, network processor 100 determines whether the port identifier associated with the stored source MAC address matches the port identifier of the received packet. If, at step 406, the port identifier of the received packet does not match the port identifier associated with the source MAC address in the I/O adapter memory, then, at step 408, network processor 100 updates the port identifier associated with the source MAC address in the I/O adapter memory and the address table (e.g., an address table stored in system memory 120) and process 400 continues to step 411. If, at step 406, the port identifier of the received packet matches the port identifier associated with the stored source MAC address, then neither the I/O adapter memory nor the address table need to be updated and process 400 proceeds to step 411.

If, at step 404, network processor 100 determines the source MAC address is not stored in the I/O adapter memory, then, at step 410, network processor 100 stores the source MAC address and its associated port identifier in both the I/O adapter memory and the address table. At step 411, an aging timer associated with the MAC address is set and started. At step 412, network processor 100 uses the MAC addresses and associated port identifiers stored in the I/O adapter memory to process future packets, and process 400 completes at step 416.

In some embodiments, if, at step 410, there is no more free memory space to store the new address in the I/O adapter memory, then network processor 100 might remove an existing address from the I/O adapter memory (e.g., cache memory 103 of FIG. 1, MAC address memory 310 of FIG. 3). A task message might be sent from network I/O adapter 104 to the MPP of network processor 100 (e.g., one of hardware accelerators 108) indicating the removal of the existing address from the first memory. Network processor

100 might then either remove the existing address from the address table (e.g., stored in system memory 120), or start (or reset) a timer for removal of the existing address from the address table after expiration of that timer.

Figure 5:
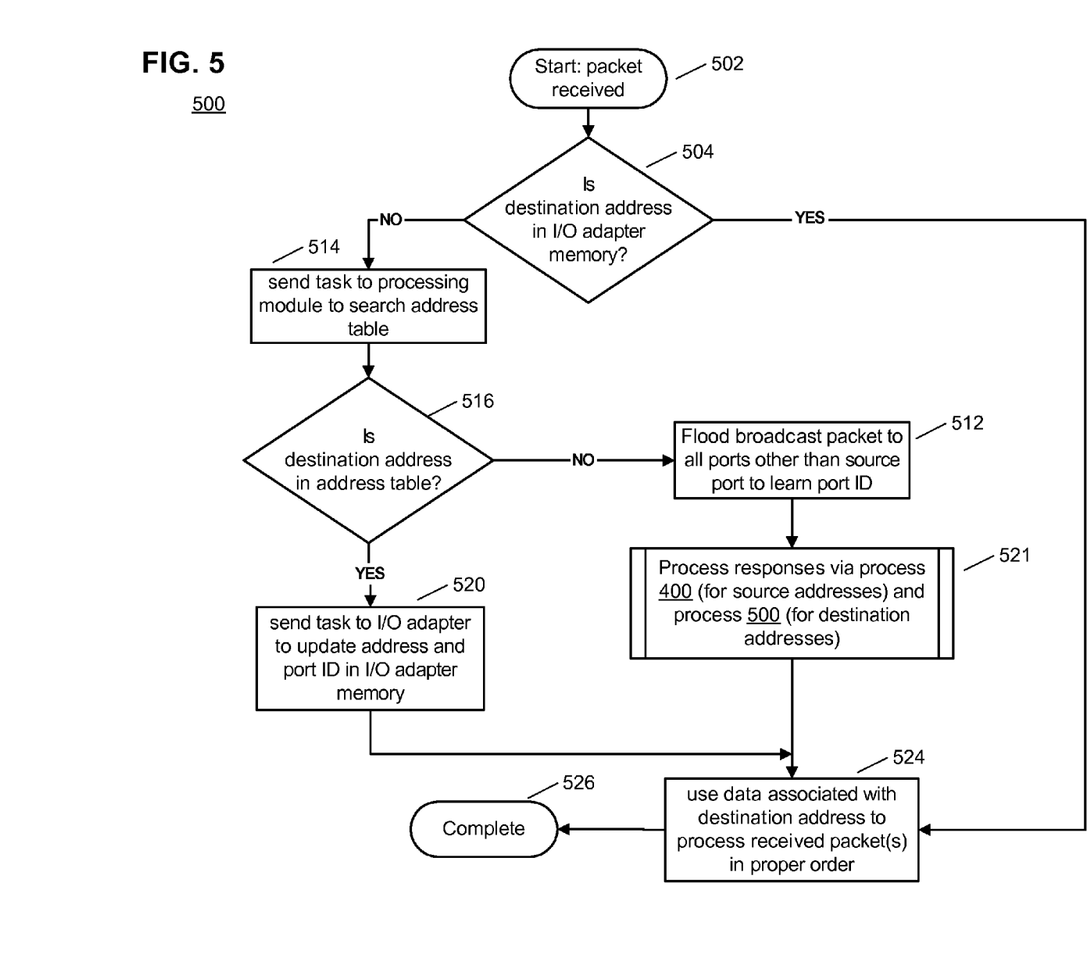
FIG. 5 shows an exemplary flow diagram of processing packets with known or unknown destination addresses in the network processor of FIG. 1.

FIG. 5 shows a flow diagram of a process 500 for processing packets depending on whether a destination MAC address of a packet is known or unknown. At step 502, a packet is received by network processor 100. At step 504, I/O adapter 104 determines whether the destination MAC address is stored in the I/O adapter memory. If, at step 504, I/O adapter 104 determines the destination MAC address is stored in the I/O adapter memory, then, at step 524, network processor 100 employs data associated with the destination MAC address and port ID to process the received packet and transmit corresponding output packets. At step 524, I/O adapter 104 transmits the corresponding output packets in a proper order (e.g., the order in which the corresponding received packets were received). The ordering might be maintained based on a sequence number or counter. At step 526, process 500 completes.

If, at step 504, the MAC address and port ID of the received packet does not match the address and port ID stored in the I/O adapter memory, then at step 514, I/O adapter 104 sends a task message to a processing module of network processor 100 (e.g., the MPP) to determine if the destination address and port ID match the address and port ID stored in the address table. If, at step 516, the address and port ID of the received packet match the address and port ID stored in the address table, then, at step 520, the MPP sends a task message to I/O adapter 104 to update the MAC address and port ID in the I/O adapter memory. At step 524, network processor 100 employs data associated with the destination MAC address and port ID to process the received packet and transmit corresponding output packets. At step 526, process 500 completes.

If, at step 516, the address and port ID of the received packet do not match the address and port ID stored in the address table or if the port ID of the destination address is unknown, then, at step 512, network processor 100 generates output packets requesting to learn the port ID of the destination MAC address, and broadcasts the packet to all port IDs except for the source port ID of the received packet. If the received packet includes a VLAN ID, then, at step 512, network processor 100 broadcasts the packet to all port IDs of the corresponding VLAN except for the source port ID of the received packet. At step 521, network processor 100 processes the one or more response packets received in response to the broadcast of step 512. Network processor 100 processes each received response packet in accordance with process 400 of FIG. 4 for the source address, and in accordance with process 500 of FIG. 5 for the destination address. At step 524, network processor 100 employs data associated with the destination MAC address and port ID to process the received packet and transmit corresponding output packets. At step 526, process 500 completes.

Figure 6:
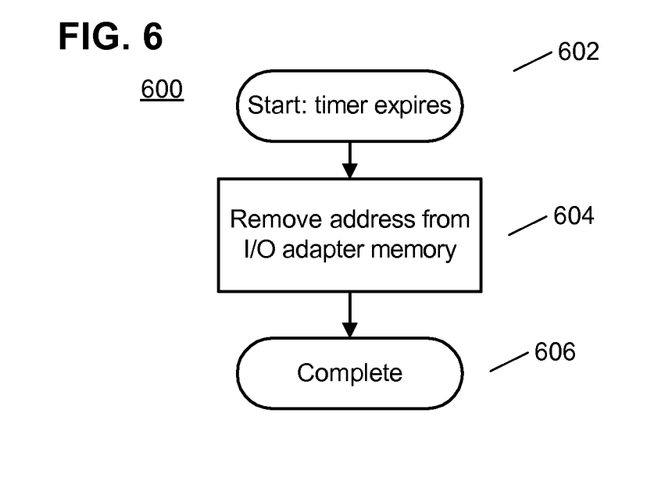
FIG. 6 shows an exemplary flow diagram of removing old addresses from memory in the network processor of FIG. 1.

FIG. 6 shows a flow diagram of a process 600 for removing a stored address from a memory of network processor 100. At step 602, a timer associated with a MAC address stored in the I/O adapter memory expires. At step 604, I/O adapter 104 removes the MAC address from the memory, and process 600 completes at step 606. In some embodiments, after removing a stored address from the I/O adapter memory at step 604, I/O adapter 104 might send a task message to the MPP indicating the removal of the stored address from the I/O adapter memory. The MPP might then optionally remove the stored address from the address table.

Thus, as described herein, embodiments process data packets received that include a source address and at least one destination address. If the destination address is stored in a memory of an I/O adapter, the received data packet is processed in accordance with bridging rules associated with each destination address stored in the I/O adapter memory. If the destination address is not stored in the I/O adapter memory, the I/O adapter sends a task message to a processor to determine whether the destination address is stored in an address table stored in a shared memory of the network processor. The I/O adapter memory has lower access latency than the address table. If the destination address is stored in the address table, the received data packet is processed in accordance with bridging rules stored in the address table and the bridging rules stored in the I/O adapter memory are updated.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation." As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

While the exemplary embodiments of the present invention have been described with respect to processing blocks in a software program, including possible implementation as a digital signal processor, micro-controller, or general purpose computer, the present invention is not so limited. As would be apparent to one skilled in the art, various functions of software might also be implemented as processes of circuits. Such circuits might be employed in, for example, a single integrated circuit, a multi-chip module, a single card, or a multi-card circuit pack.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, the terms "system," "component," "module," "interface,", "model" or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements. Signals and corresponding nodes or ports might be referred to by the same name and are interchangeable for purposes here.

Although the subject matter described herein may be described in the context of illustrative implementations to process one or more computing application features/operations for a computing application having user-interactive components the subject matter is not limited to these particular embodiments. Rather, the techniques described herein can be applied to any suitable type of user-interactive component execution management methods, systems, platforms, and/or apparatus.

The present invention can be embodied in the form of methods and apparatuses for practicing those methods. The present invention can also be embodied in the form of program code embodied in tangible media, such as magnetic recording media, optical recording media, solid state memory, floppy diskettes, CD-ROMs, hard drives, or any other non-transitory machine-readable storage medium, wherein, when the program code is loaded into and executed by a machine, such as a computer, the machine becomes an apparatus for practicing the invention. The present invention can also be embodied in the form of program code, for example, whether stored in a non-transitory machine-readable storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits. The present invention can also be embodied in the form of a bitstream or other sequence of signal values electrically or optically transmitted through a medium, stored magnetic-field variations in a magnetic recording medium, etc., generated using a method and/or an apparatus of the present invention.

It should be understood that the steps of the exemplary methods set forth herein are not necessarily required to be performed in the order described, and the order of the steps of such methods should be understood to be merely exemplary. Likewise, additional steps might be included in such methods, and certain steps might be omitted or combined, in methods consistent with various embodiments of the present invention.

It will be further understood that various changes in the details, materials, and arrangements of the parts which have been described and illustrated in order to explain the nature of this invention might be made by those skilled in the art without departing from the scope of the invention as expressed in the following claims.

We claim:

1. A method of processing data packets received by a network processor comprising a plurality of processing modules and at least one shared memory, the method comprising:
receiving a data packet by the network processor, the data packet including an associated source address and at least one associated destination address;
determining, by an I/O adapter of the network processor, whether the at least one associated destination address is stored in a memory of the I/O adapter;
if the at least one associated destination address is stored in the I/O adapter memory:
processing the received data packet in accordance with one or more bridging rules associated with each destination address stored in the I/O adapter memory;
if the at least one associated destination address is not stored in the I/O adapter memory:
sending, by the I/O adapter, a task message via a task communication ring bus of the network processor, to a processing module of the network processor, the task message comprising the at least one associated destination address;
determining, by the processing module, whether the at least one associated destination address in the task message is stored in an address table stored in the at least one shared memory of the network processor;
if the at least one associated destination address is stored in the address table:
processing, based on the task message, the received data packet in accordance with one or more bridging rules associated with each destination address stored in the address table; and
updating, based on the bridging rules associated with the destination address stored in the address table, the bridging rules associated with the destination address stored in the I/O adapter memory,
wherein the I/O adapter memory has lower access latency than the address table.

2. The method of claim 1, wherein the source address and the destination address each comprise one or more of a media access control (MAC) address and a port identifier.

3. The method of claim 1, further comprising:
if the at least one associated destination address is not stored in either the I/O adapter memory or the address table, broadcasting, by the network processor, a packet to all destinations coupled to the network processor, the packet requesting that a network device corresponding to the destination address send a response packet to the network processor.

4. The method of claim 1, further comprising:
determining whether the associated source address of the received data packet is stored in the I/O adapter memory;
if the associated source address is not stored in the I/O adapter memory:
updating the bridging rules associated with the source address stored in the I/O adapter memory;
sending, by the I/O adapter, a task message to a processing module of the network processor, the task message comprising the associated source address;
processing, by the processing module of the network processor based on the task message, the received data packet in accordance with the updated bridging rules associated with the associated source address; and updating, based on the updated bridging rules associated with the source address stored in the I/O adapter memory, the bridging rules associated with the source address stored in the address table.

5. The method of claim 4, further comprising:
if the associated source address is stored in the I/O adapter memory:
determining whether the port identifier associated with the source address of the received data packet matches the port identifier associated with the source address in the I/O adapter memory by the steps of:
updating, by the I/O adapter, aging data corresponding to the source address stored in the I/O adapter memory;
sending, by the I/O adapter, a task message to a processing module of the network processor, the task message comprising the updated aging data corresponding to the source address; and
updating, by the processing module based on the task message, the aging data associated with the source address stored in the address table.

6. The method of claim 5, wherein:
if the port identifier for the associated source address of the received data packet does not match the port identifier for the source address stored in the I/O adapter memory:
updating the port identifier for the source address stored in the I/O adapter memory;
sending a task message to a processing module of the network processor, the task message comprising the updated port identifier for the source address; and
updating, by the processing module based on the task message, the port identifier associated with the source address stored in the address table.

7. The method of claim 1, further comprising:
if the I/O adapter memory has reached a filled threshold when a data packet having a new address is received:
selecting an entry of the I/O adapter memory to be overwritten by the new address;
updating the entry of the I/O adapter memory with the new address;
starting an aging timer for the updated entry of the I/O adapter memory;
sending a task message to a processing module of the network processor, the task message comprising the updated address;
updating, by the processing module, the address table; and
starting an aging timer for the updated address in the address table.

8. The method of claim 7, wherein the step of selecting an existing stored address in the I/O adapter memory to be overwritten by the new address comprises:
selecting a relative oldest entry stored in the I/O adapter memory.

9. The method of claim 1, further comprising:
when the address table has reached a filled threshold:
maintaining synchronization between the I/O adapter memory and the address table by not storing new addresses in the I/O adapter memory.

10. The method of claim 1, the I/O adapter comprising a timer corresponding to each entry in the I/O adapter memory, the method further comprising:

starting a timer corresponding to an entry of the I/O adapter memory when an address is stored in the memory entry;
resetting and restarting the timer corresponding to a memory entry when a subsequent packet is received having an address matching the address stored in the memory entry if the subsequent packet is received before the timer reaches a threshold;
if the timer reaches a threshold:
removing the stored address from the I/O adapter memory; and
sending a task message to a processing module of the network processor indicating the removal of the stored address from the I/O adapter memory.

11. The method of claim 1, wherein the method is implemented by a machine executing program code encoded on a non-transitory machine-readable storage medium.

12. A network processor for processing data packets received from a communication link coupled to a packet-switched network, the network processor comprising:
a plurality of processing modules and at least one shared memory;
an I/O adapter configured to determine (i) an associated source address of each received data packet and at least one associated destination address of each received data packet, and (ii) whether the at least one associated destination address is stored in a memory of the I/O adapter;
if the at least one associated destination address is stored in the I/O adapter memory, the I/O adapter is configured to:
process the received data packet in accordance with one or more bridging rules associated with each destination address stored in the I/O adapter memory;
if the at least one associated destination address is not stored in the I/O adapter memory, the I/O adapter is configured to:
send a task message via a task communication ring bus of the network processor to one of the plurality of processing modules of the network processor, the task message comprising the at least one associated destination address, wherein the processing module is configured to determine whether the at least one associated destination address in the task message is stored in an address table stored in the at least one shared memory;
if the at least one associated destination address is stored in the address table, the processing module is configured to:
process, based on the task message, the received data packet in accordance with one or more bridging rules associated with each destination address stored in the address table; and
update, based on the bridging rules associated with the destination address stored in the address table, the bridging rules associated with the destination address stored in the I/O adapter memory,
wherein the I/O adapter memory has lower access latency than the address table.

13. The network processor of claim 12, wherein the source address and the destination address each comprise one or more of a media access control (MAC) address and a port identifier.

14. The network processor of claim 12, wherein, if the at least one associated destination address is not stored in either the I/O adapter memory or the address table, the network processor is configured to broadcast a packet to all destinations coupled to the network processor, the packet requesting that a network device corresponding to the destination address send a response packet to the network processor.

15. The network processor of claim 12, wherein:
the I/O adapter is further configured to:
determine whether the associated source address of the received data packet is stored in the I/O adapter memory;
if the associated source address is not stored in the I/O adapter memory:
update the bridging rules associated with the source address stored in the I/O adapter memory; and
send a task message to one of the processing modules of the network processor, the task message comprising the associated source address, wherein the processing module is configured to (i) process, based on the task message, the received data packet in accordance with the updated bridging rules associated with the associated source address, and (ii) update, based on the updated bridging rules associated with the source address stored in the I/O adapter memory, the bridging rules associated with the source address stored in the address table.

16. The network processor of claim 15, wherein, if the associated source address is stored in the I/O adapter memory:
the I/O adapter is further configured to:
determine whether the port identifier associated with the source address of the received data packet matches the port identifier associated with the source address in the I/O adapter memory;
update aging data corresponding to the source address stored in the I/O adapter memory; and
send a task message to a processing module of the network processor, the task message comprising the updated aging data corresponding to the source address, wherein the processing module is configured to, based on the task message, update the aging data associated with the source address stored in the address table.

17. The network processor of claim 16, wherein, if the port identifier for the associated source address of the received data packet does not match the port identifier for the source address stored in the I/O adapter memory:
the I/O adapter is further configured to:
update the port identifier for the source address stored in the I/O adapter memory; and
send a task message to a processing module of the network processor, the task message comprising the updated port identifier for the source address, wherein the processing module is configured to, based on the task message, update the port identifier associated with the source address stored in the address table.

18. The network processor of claim 12, wherein, if the I/O adapter memory has reached a filled threshold when a data packet having a new address is received:
the I/O adapter is further configured to:
select an entry of the I/O adapter memory to be overwritten by the new address;
update the entry of the I/O adapter memory with the new address;
start an aging timer for the updated entry of the I/O adapter memory;
send a task message to a processing module of the network processor, the task message comprising the updated address, wherein the processing module is configured to (i) update the address table, and (ii) start an aging timer for the updated address in the address table.

19. The network processor of claim 12, wherein, when the address table has reached a filled threshold, the I/O adapter is configured to maintain synchronization between the I/O adapter memory and the address table by not storing new addresses in the I/O adapter memory.

20. The network processor of claim 12, wherein the I/O adapter comprises a timer corresponding to each entry in the I/O adapter memory, and the I/O adapter is further configured to:
start a timer corresponding to an entry of the I/O adapter memory when an address is stored in the memory entry;
reset and restart the timer corresponding to a memory entry when a subsequent packet is received having an address matching the address stored in the memory entry if the subsequent packet is received before the timer reaches a threshold;
if the timer reaches a threshold:
remove the stored address from the I/O adapter memory; and
send a task message to a processing module of the network processor indicating the removal of the stored address from the I/O adapter memory.

* * * * *